(12) United States Patent
Futa et al.

(10) Patent No.: US 7,023,362 B2
(45) Date of Patent: Apr. 4, 2006

(54) POSITIONAL INFORMATION STORAGE SYSTEM AND METHOD, SEMICONDUCTOR MEMORY, AND PROGRAM

(75) Inventors: Yuichi Futa, Osaka (JP); Motoji Ohmori, Hirakata (JP); Makoto Tatebayashi, Takarazuka (JP)

(73) Assignee: Matsushita Electric Industrial Co., Ltd., Osaka-Fu (JP)

( * ) Notice: Subject to any disclaimer, the term of this patent is extended or adjusted under 35 U.S.C. 154(b) by 226 days.

(21) Appl. No.: 10/410,280

(22) Filed: Apr. 10, 2003

(65) Prior Publication Data
US 2003/0222797 A1    Dec. 4, 2003

(30) Foreign Application Priority Data
Apr. 12, 2002  (JP) .............................. 2002-110165

(51) Int. Cl.
   *G08G 1/123*    (2006.01)
(52) U.S. Cl. .................. 340/988; 340/539.11; 379/38; 701/207; 701/213
(58) Field of Classification Search ................ 340/988, 340/5.52, 5.53, 539.11, 539.13, 573.1, 573.4; 701/207, 213, 300, 35; 455/456, 457; 379/38
   See application file for complete search history.

(56) References Cited

U.S. PATENT DOCUMENTS

| | | | |
|---|---|---|---|
| 4,960,982 A | 10/1990 | Takahira ..................... 235/382 |
| 5,014,206 A * | 5/1991 | Scribner et al. ............ 701/207 |
| 5,434,787 A * | 7/1995 | Okamoto et al. ........... 701/214 |
| 5,581,464 A * | 12/1996 | Woll et al. .................... 701/35 |
| 5,919,239 A * | 7/1999 | Fraker et al. ................. 701/35 |
| 6,038,522 A | 3/2000 | Manson et al. ............. 345/348 |
| 6,084,542 A * | 7/2000 | Wright et al. .......... 342/357.13 |
| 6,091,816 A | 7/2000 | Woo .............................. 380/4 |
| 6,148,262 A | 11/2000 | Fry ............................. 701/213 |
| 6,282,097 B1 | 8/2001 | Minelli et al. .............. 361/728 |
| 6,282,362 B1 | 8/2001 | Murphy et al. ............... 386/46 |
| 6,356,836 B1 | 3/2002 | Adolph ....................... 701/208 |
| 6,490,513 B1 * | 12/2002 | Fish et al. .................... 701/35 |
| 6,591,242 B1 * | 7/2003 | Karp et al. .................... 705/2 |
| 6,711,496 B1 * | 3/2004 | Denton ....................... 701/207 |

(Continued)

FOREIGN PATENT DOCUMENTS
DE    100 37 100    2/2002

(Continued)

OTHER PUBLICATIONS
B. Schneier, "Applied Cryptography, Second Edition", Applied Cryptography Protocols, Algorithms, and Source Code in C, New York, John Wiley & Sons, US, pp. 31-42.

(Continued)

*Primary Examiner*—Brent A. Swarthout
(74) *Attorney, Agent, or Firm*—Wenderoth, Lind & Ponack, L.L.P.

(57) ABSTRACT

A positional information storage system stores and verifies positional information of a mobile terminal apparatus. The positional information storage system stores (i) the positional information, (ii) time information, and (iii) signature data that is generated by placing a digital signature on a combination of the time information and the positional information of the mobile terminal apparatus only if a user of the mobile terminal apparatus is successfully authenticated. The positional information storage system also verifies whether the signature data is authentic. With this construction, it is possible to authenticate a person carrying the mobile terminal apparatus, and to verify whether data to be stored in the memory has been tampered with.

16 Claims, 4 Drawing Sheets

U.S. PATENT DOCUMENTS 6,718,239 B1 *   4/2004   Rayner ..................... 701/35
2001/0041593 A1   11/2001   Asada ..................... 455/558

FOREIGN PATENT DOCUMENTS

| EP | 0 320 913   | 6/1989 |
| EP | 1 001 601   | 5/2000 |
| EP | 1 118 837   | 7/2001 |
| JP | 2002-27527  | 1/2002 |

OTHER PUBLICATIONS

Garmin Corp. "GPSMAP76 Specification" WEBARCHIVE.ORG, Online, Oct. 24, 2001, p. 1-2, XP002270847, retreived from the Internet: <URL:http://web.archive.org/web/20011024155640/www.garmin.com/products/gps-map76/spec.html> retrieved on Dec. 12, 2003.

"Security & Chip Card ICS SLE 66CX80S" Short Product Information Infineon Technologies, Jun. 1999, pp. 1-6.

* cited by examiner

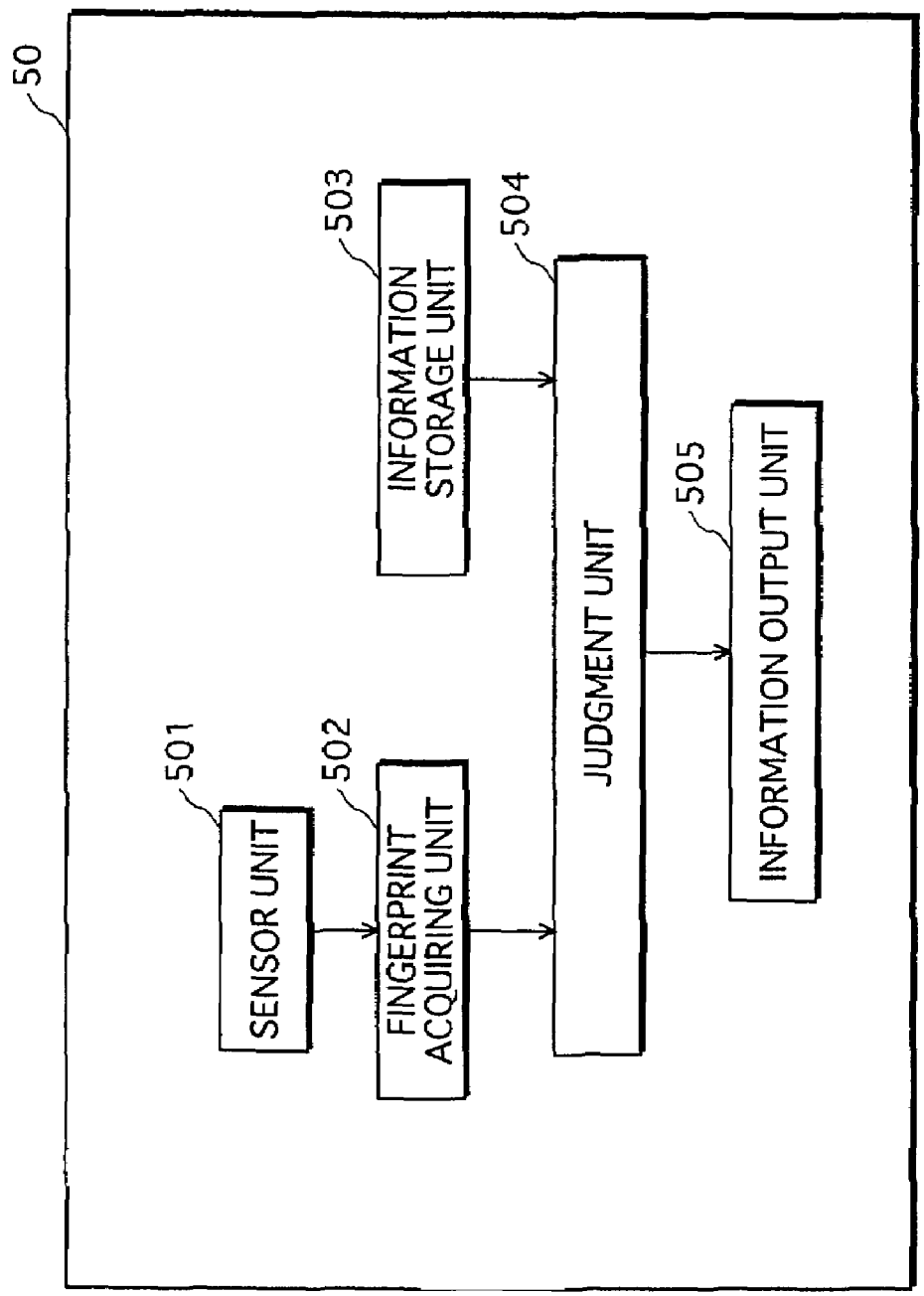

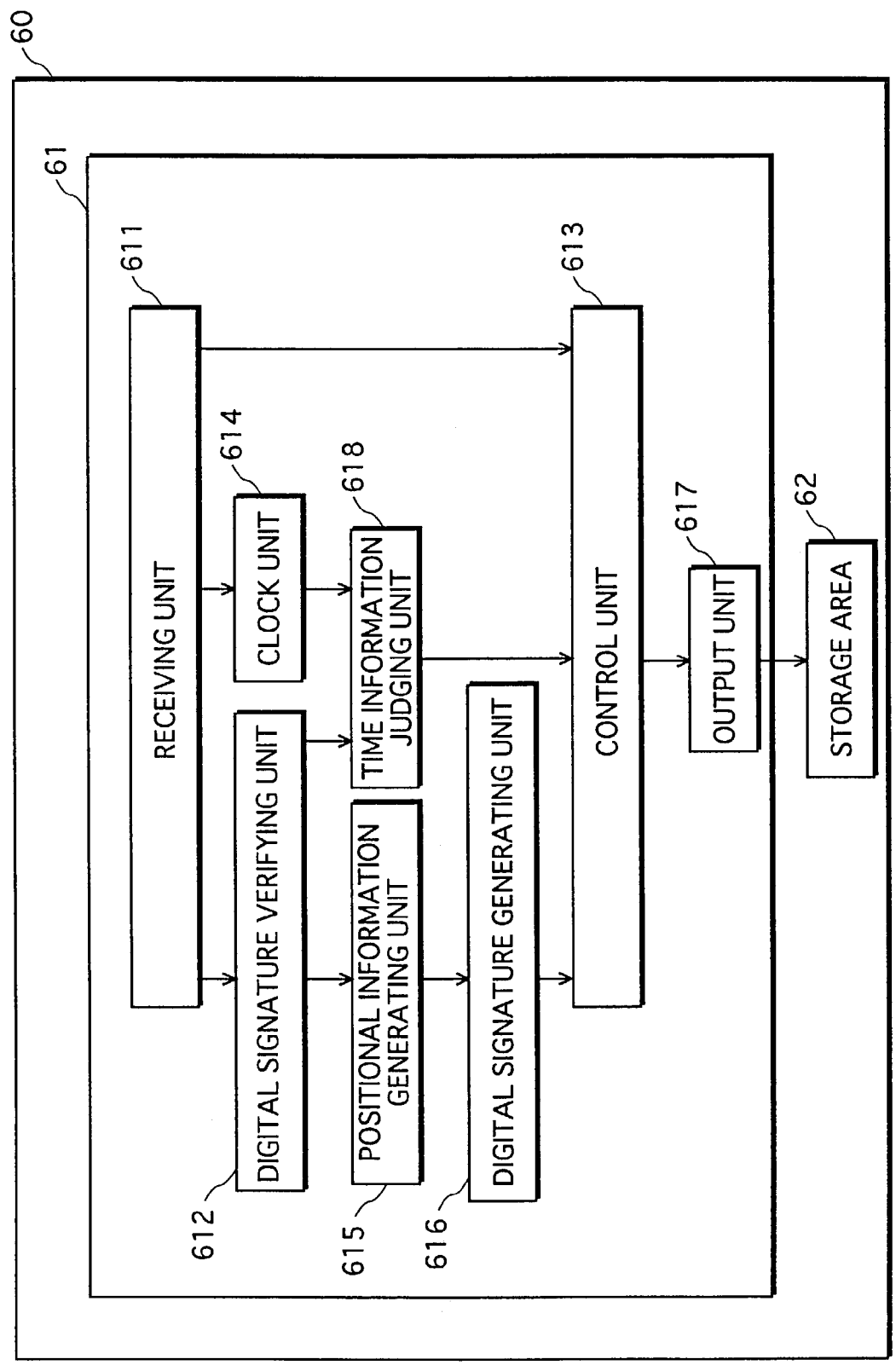

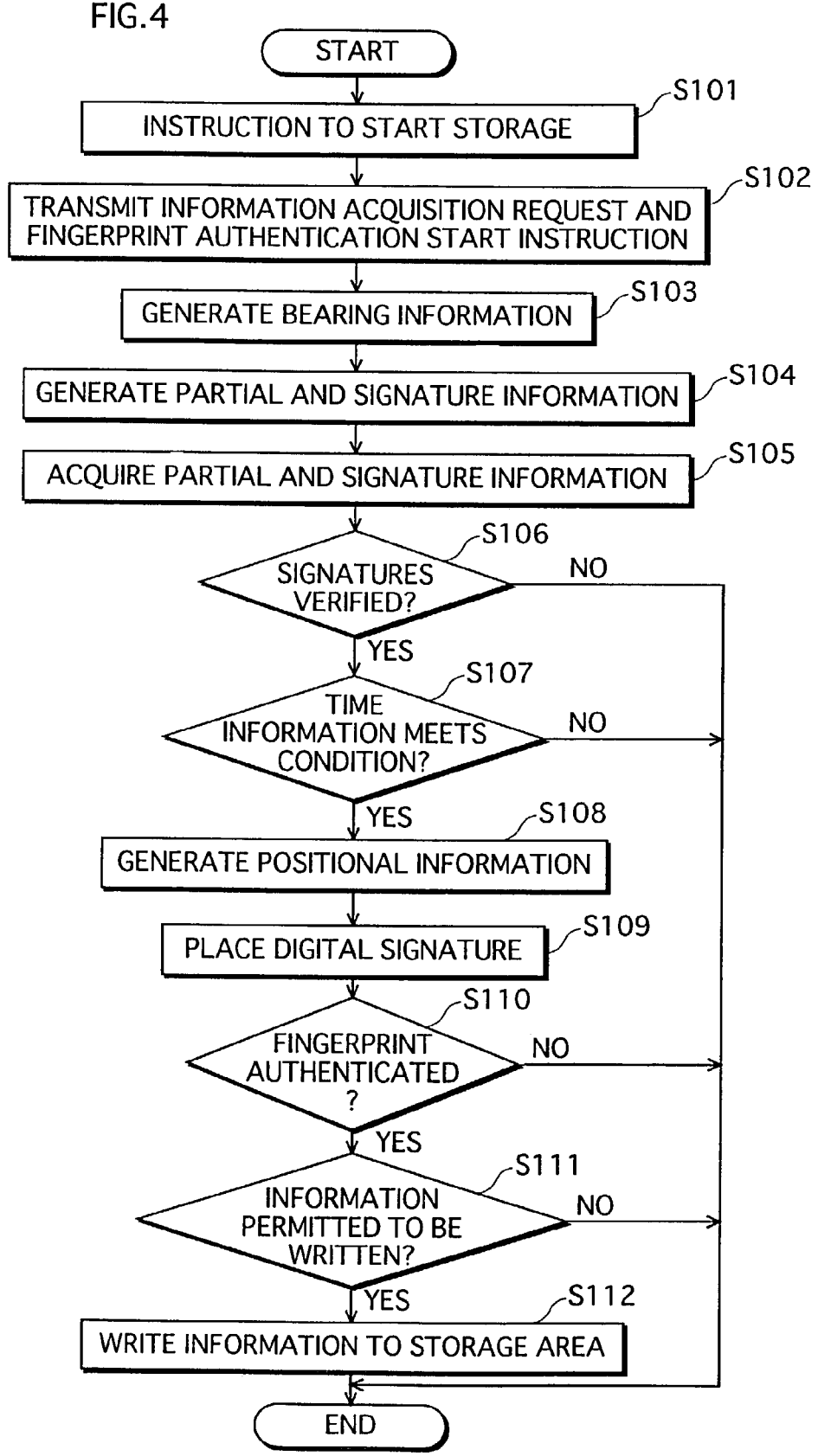

POSITIONAL INFORMATION STORAGE SYSTEM AND METHOD, SEMICONDUCTOR MEMORY, AND PROGRAM

This application is based on an application No. 2002-110165 filed in Japan, the content of which is hereby incorporated by reference.

BACKGROUND OF THE INVENTION (1) Field of the Invention

The present invention relates to a positional information storage system that stores pieces of positional information of a communication terminal apparatus carried by a user and relates to a semiconductor memory.

(2) Description of the Related Art

In recent years, various systems that use positional information of a mobile wireless terminal have been proposed in which the positional information is acquired through a communication between the mobile wireless terminal and a base station or by using the Global Positioning System (GPS). Refer to, for example, Japanese Laid-Open Patent Application No. 2002-27527.

One of such systems is a management system for managing the working state of workers.

Here, the management system will be explained using a case where the system is used by a home delivery company.

A manager of the home delivery company needs to keep track of a worker's locations and working state while the worker delivers packages to clients outside the company building.

It is mandatory for the worker to carry a mobile wireless terminal when he/she is outside the company building.

The mobile wireless terminal acquires, every certain time period, its positional information through a communication with a base station or by using the GPS, and stores the acquired pieces of positional information in a storage area provided in itself.

The worker returns to the company building after delivering all packages assigned to the worker.

The manager in the company building can keep track of the worker's locations and working state by referring to the pieces of positional information recorded every certain time period.

However, the worker may tamper the contents of the memory or may have another person carry the mobile wireless terminal. When such unauthorized manipulations are done, the manager has wrong recognition on the worker's locations or working state.

SUMMARY OF THE INVENTION

The object of the present invention is therefore to provide a positional information storage system that can prevent unauthorized manipulations of pieces of positional information of a mobile wireless terminal that are stored in the system.

The above object is fulfilled by a positional information storage system that stores pieces of positional information of a communication terminal apparatus carried by a user, the positional information storage system comprising: a transmission apparatus operable to transmit element information concerning a position of the communication terminal apparatus to the communication terminal apparatus, the communication terminal apparatus operable to receive and output the element information; a semiconductor memory having an area for storing information, the semiconductor memory including: an information storage unit operable to store information; a position management unit operable to receive the element information from the communication terminal apparatus, and generate positional information based on the received element information; a time management unit operable to generate generation time information that indicates a time at which the positional information is generated; a signature generating unit operable to generate signature data by placing a digital signature on trail information that is composed of the generation time information and the positional information; and a writing unit operable to write the trail information and the signature data as corresponding to each other into the information storage unit; and a verification apparatus operable to read the trail information and the signature data from the information storage unit of the semiconductor memory and verify the read trail information using the trail information and the signature data.

With the above-described construction, the positional information storage system stores into the storage area (i) the positional information of the mobile terminal apparatus carried by the user, (ii) the time information related to the positional information, and (iii) the signature data that is generated by placing a digital signature on a combination of the time information and the positional information. This enables the verifier to read the positional information, the time information, and the signature data from the storage area and to confirm, by checking the signature data, that the time information and the positional information have not been tampered with, preventing unauthorized manipulations of information.

The above object is fulfilled by a positional information storage system that stores pieces of positional information of a communication terminal apparatus carried by a user, and comprises a transmission apparatus, the communication terminal apparatus, a mobile semiconductor memory, and a verification apparatus, wherein the transmission apparatus transmits element information concerning a position of the communication terminal apparatus to the communication terminal apparatus, the communication terminal apparatus receives and outputs the element information to the semiconductor memory being inserted therein, the semiconductor memory includes an information storage unit, which has an area for storing information, and a tamper-resistant module. The tamper-resistant module includes: a position management unit operable to generate positional information based on the received element information; a time acquiring unit operable to acquire generation time information that indicates a time related to the positional information; a signature generating unit operable to generate signature data by placing a digital signature on trail information that is composed of the generation time information and the positional information; and a writing unit operable to write the trail information and the signature data as corresponding to each other into the information storage unit. The verification apparatus reads the trail information and the signature data from the information storage unit of the semiconductor memory and verifies the read trail information using the trail information and the signature data.

With the above-described construction, the positional information storage system stores into the storage area (i) the positional information of the mobile terminal apparatus carried by the user, (ii) the acquired time information related to the positional information, and (iii) the signature data that is generated by placing a digital signature on a combination of the time information and the positional information. This enables the verifier to read the positional information, the time information, and the signature data from the storage area and to confirm, by checking the signature data, that the time information and the positional information have not been tampered with, preventing unauthorized manipulations of information.

In the above positional information storage system, the time acquiring unit may generate the generation time information that indicates a time at which the positional information is generated.

With the above-described construction, the positional information storage system stores into the storage area (i) the positional information of the mobile terminal apparatus carried by the user, (ii) the generated time information related to the positional information, and (iii) the signature data that is generated by placing a digital signature on a combination of the time information and the positional information. This enables the verifier to read the positional information, the time information, and the signature data from the storage area and to confirm, by checking the signature data, that the time information and the positional information have not been tampered with, preventing unauthorized manipulations of information.

In the above positional information storage system, the tamper-resistant module may further include a control unit operable to, when a predetermined condition is met, control the writing unit so as to inhibit writing of the trail information and the signature data.

With the above-described construction, writing of the trail information and the signature data into the storage area is inhibited if it is judged that the predetermined condition is met. This prevents unauthorized manipulations of information or writing of unauthorized information into the memory.

The above positional information storage system may further comprise a management server that transmits server time information generated based on a clock embedded therein, the tamper-resistant module further includes a time information judging unit operable to receive the server time information and if a difference between values indicated by the server time information and the generation time information is greater than a predetermined value, transmit a write inhibition instruction to the control unit, and upon receiving the write inhibition instruction, the control unit judges that the predetermined condition is met, and controls the writing unit so as to inhibit writing of the trail information and the signature data.

With the above-described construction, writing of the trail information and the signature data into the storage area is inhibited if the time information is not authenticated. This prevents unauthorized manipulations of information or writing of unauthorized information into the memory.

The above positional information storage system may further comprise an authentication apparatus operable to store in advance pieces of authentication information to be used for authentication, acquire personal information from the user, and transmit a write inhibition instruction to the control unit if the personal information does not match one of the stored pieces of authentication information, wherein upon receiving the write inhibition instruction, the control unit judges that the predetermined condition is met, and controls the writing unit so as to inhibit writing of the trail information and the signature data.

With the above-described construction, writing of the trail information and the signature data into the storage area is inhibited if the user does not carry the mobile terminal apparatus. This prevents unauthorized manipulations of information or writing of unauthorized information into the memory.

In the above positional information storage system, the authentication apparatus may store, as the pieces of authentication information, characteristics of fingerprints, and acquires characteristics of a fingerprint of the user from the user as the personal information.

With the above-described construction, writing of the trail information and the signature data into the storage area is inhibited if it is detected from the fingerprint authentication that the user does not carry the mobile terminal apparatus. This prevents unauthorized manipulations of information or writing of unauthorized information into the memory.

The above positional information storage system may further comprise a management server that transmits server time information generated based on a clock embedded therein, and the time acquiring unit acquires the server time information as the generation time information.

With the above-described construction, the positional information storage system stores into the storage area (i) the positional information of the mobile terminal apparatus carried by the user, (ii) the received time information related to the positional information, and (iii) the signature data that is generated by placing a digital signature on a combination of the time information and the positional information. This enables the verifier to read the positional information, the time information, and the signature data from the storage area and to confirm, by checking the signature data, that the time information and the positional information have not been tampered with, preventing unauthorized manipulations of information.

In the above positional information storage system, the tamper-resistant module may further include a control unit operable to, when a predetermined condition is met, control the writing unit so as to inhibit writing of the trail information and the signature data.

With the above-described construction, writing of the trail information and the signature data into the storage area is inhibited if it is judged that the predetermined condition is met. This prevents unauthorized manipulations of information or writing of unauthorized information into the memory.

The above positional information storage system may further comprise an authentication apparatus operable to store in advance pieces of authentication information to be used for authentication, acquire personal information from the user, and transmit a write inhibition instruction to control unit if the personal information does not match one of the stored pieces of authentication information, wherein upon receiving the write inhibition instruction, the control unit judges that the predetermined condition is met, and controls the writing unit so as to inhibit writing of the trail information and the signature data.

With the above-described construction, writing of the trail information and the signature data into the storage area is inhibited if the user does not carry the mobile terminal apparatus. This prevents unauthorized manipulations of information or writing of unauthorized information into the memory.

In the above positional information storage system, the authentication apparatus may store, as the pieces of authentication information, characteristics of fingerprints, and acquires characteristics of a fingerprint of the user from the user as the personal information.

With the above-described construction, writing of the trail information and the signature data into the storage area is inhibited if it is detected from the fingerprint authentication that the user does not carry the mobile terminal apparatus. This prevents unauthorized manipulations of information or writing of unauthorized information into the memory.

The above object is also fulfilled by a positional information storage system that stores pieces of positional information of a communication terminal apparatus carried by a user, and comprises a transmission apparatus, the communication terminal apparatus, a mobile semiconductor memory, and a verification apparatus, wherein the transmission apparatus transmits (i) element information concerning a position of the communication terminal apparatus and (ii) additional data which is generated by placing a digital signature on the element information, to the communication terminal apparatus. The communication terminal apparatus receives and outputs the element information and the additional data to the semiconductor memory being inserted therein. The semiconductor memory includes an information storage unit, which has an area for storing information, and a tamper-resistant module. The tamper-resistant module includes: a position management unit operable to, if having verified by checking the received additional data that the element information has not been tampered with, generate positional information based on the received element information; a time acquiring unit operable to acquire generation time information that indicates a time related to the positional information; a signature generating unit operable to generate signature data by placing a digital signature on trail information that is composed of the generation time information and the positional information; and a writing unit operable to write the trail information and the signature data as corresponding to each other into the information storage unit. The verification apparatus reads the trail information and the signature data from the information storage unit of the semiconductor memory and verifies the read trail information using the trail information and the signature data.

The above-described construction prevents unauthorized manipulations of information or tampering of the element information.

The above object is also fulfilled by a mobile, tamper-resistant semiconductor memory being inserted in a communication terminal apparatus carried by a user and generating positional information of the communication terminal apparatus based on element information received from the communication terminal apparatus and storing the generated positional information, the semiconductor memory comprising: an information storage unit operable to store received information; a position management unit operable to receive the element information, which is related to a position of the communication terminal apparatus, from the communication terminal apparatus, and generate, based on the received element information, the positional information that indicates a position of the communication terminal apparatus; a time management unit operable to generate generation time information that indicates a time at which the positional information is generated; a signature generating unit operable to generate signature data by placing a digital signature on trail information that is composed of the generation time information and the positional information; and a writing unit operable to write the trail information and the signature data as corresponding to each other into the information storage unit.

With the above-described construction, the semiconductor memory stores into the storage area (i) the positional information of the mobile terminal apparatus carried by the user, (ii) the time information related to the positional information, and (iii) the signature data that is generated by placing a digital signature on a combination of the time information and the positional information. This enables the verifier to verify whether data stored in the memory has been tampered with, preventing unauthorized manipulations of information.

In the above semiconductor memory, the signature generating unit may place the digital signature on the trail information using personal information, which has been held in advance, as a secret key.

The above object is also fulfilled by a mobile, tamper-resistant semiconductor memory being inserted in a communication terminal apparatus carried by a user and generating positional information of the communication terminal apparatus based on element information received from the communication terminal apparatus and storing the generated positional information. The semiconductor memory operation comprises: a position management step for acquiring the element information, which is related to a position of the communication terminal apparatus, and generating, based on the acquired element information, the positional information that indicates a position of the communication terminal apparatus; a time management step for generating generation time information that indicates a time at which the positional information is generated; a signature generating step for generating signature data by placing a digital signature on trail information that is composed of the generation time information and the positional information; and a writing step for writing the trail information and the signature data as corresponding to each other into the storage area.

With the above-described construction, the semiconductor memory stores into the storage area (i) the positional information of the mobile terminal apparatus carried by the user, (ii) the time information related to the positional information, and (iii) the signature data that is generated by placing a digital signature on a combination of the time information and the positional information. This enables the verifier to verify whether data stored in the memory has been tampered with, preventing unauthorized manipulations of information.

The above object is also fulfilled by a program which is applied to a mobile, tamper-resistant semiconductor memory being inserted in a communication terminal apparatus carried by a user, and enables the semiconductor memory to store pieces of positional information of the communication terminal apparatus in a storage area provided in the semiconductor memory. The program comprises: a position management step for acquiring element information, which is related to a position of the communication terminal apparatus, and generating, based on the acquired element information, positional information that indicates a position of the communication terminal apparatus; a time management step for generating generation time information that indicates a time at which the positional information is generated; a signature generating step for generating signature data by placing a digital signature on trail information that is composed of the generation time information and the positional information; and a writing step for writing the trail information and the signature data as corresponding to each other into the storage area.

With the above-described construction, the semiconductor memory stores into the storage area (i) the positional information of the mobile terminal apparatus carried by the user, (ii) the time information related to the positional information, and (iii) the signature data that is generated by placing a digital signature on a combination of the time information and the positional information. This enables the verifier to verify whether data stored in the memory has been tampered with, preventing unauthorized manipulations of information.

BRIEF DESCRIPTION OF THE DRAWINGS

These and the other objects, advantages and features of the invention will become apparent from the following description thereof taken in conjunction with the accompanying drawings which illustrate a specific embodiment of the invention.

In the drawings:

FIG. 2 is a block diagram showing the construction of the fingerprint authentication apparatus;

FIG. 3 is a block diagram showing the construction of the memory card; and

FIG. 4 is a flowchart of the operation in the positional information storage system after the user instructs to start the storage information until the trail information and the verification signature information are written in the memory card.

DESCRIPTION OF THE PREFERRED EMBODIMENT

Figure 1:
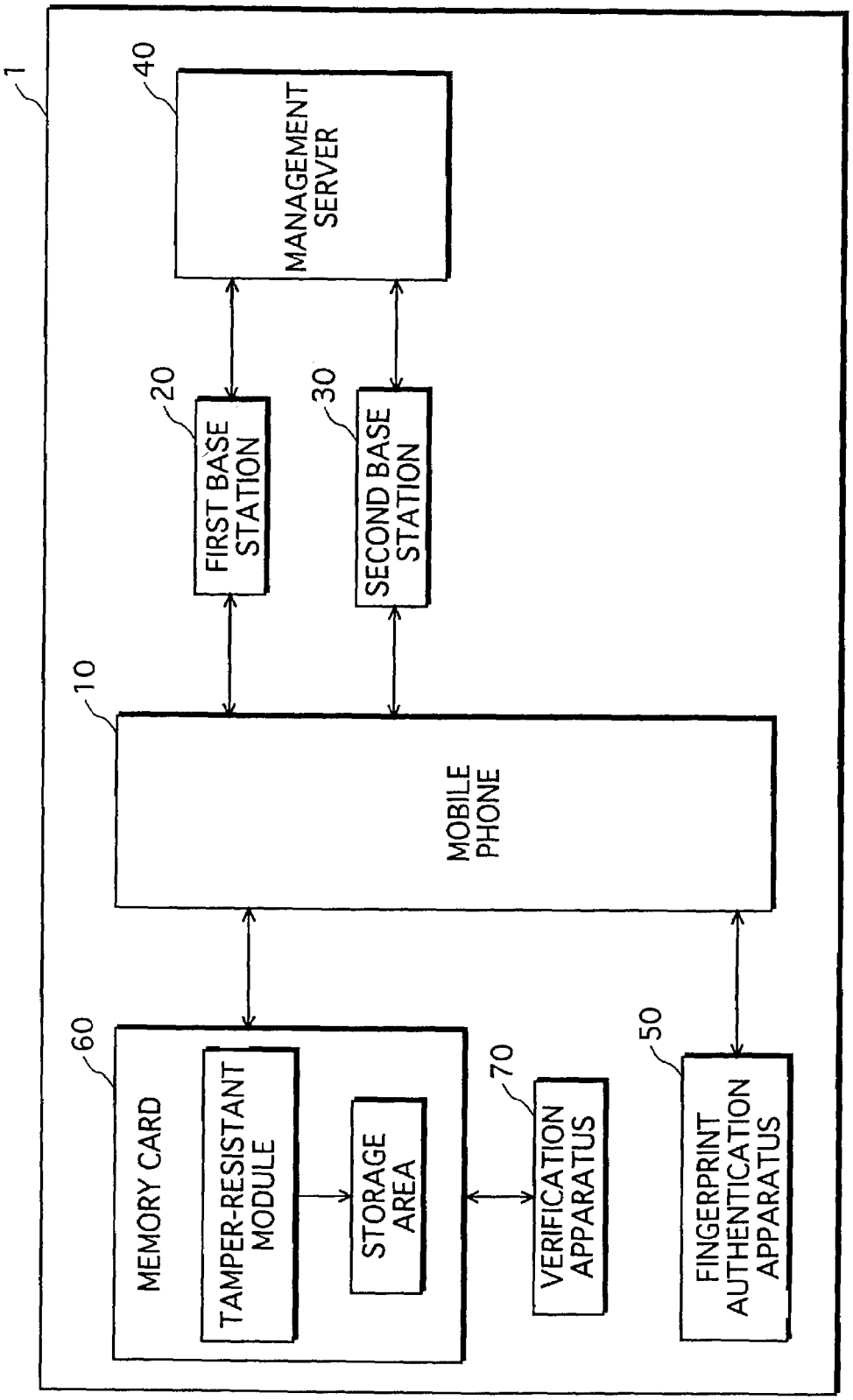
FIG. 1 is a block diagram showing the construction of the positional information storage system.

The following describes a positional information storage system 1 as a preferred embodiment of the present invention, with reference to the attached drawings.

Construction

FIG. 1 is a block diagram showing the construction of the positional information storage system 1.

A mobile phone 10 transmits an information acquisition request to a first base station 20 and a second base station 30 by wireless communications.

The first base station 20 and the second base station 30, upon receiving the information acquisition request, generate information, and transmit the generated information to a management server 40 by wired or wireless communication.

The management server 40 manipulates the received information, and transmits the manipulated information back to the sender of the information.

The first base station 20 and the second base station 30, upon receiving information from the management server 40, transmit the received information to the mobile phone 10 by wireless communications.

The mobile phone 10 is capable of receiving a memory card 60, which is inserted therein through a memory card slot thereof. The mobile phone 10 is electrically connected with the inserted memory card 60. In the connected state, the mobile phone 10 transmits the information received from the first base station 20 and the second base station 30 to the memory card 60.

The memory card 60 manipulates the information received from the mobile phone 10 and stores the manipulated information in itself.

A verification apparatus 70, having the memory card slot and being electrically connected with the inserted memory card 60, reads information from the memory card 60, and verifies the read information.

The mobile phone 10 is carried by the user who works for, for example, a home delivery company and changes the actual location over time in working hours.

The manager uses the verification apparatus 70 to keep track of the user's movements and working state.

Mobile Phone 10

The mobile phone 10 is a mobile, small telephone that is carried by the user and has a numeric keypad with which the user inputs telephone numbers, a keypad including a start key with which the user uses to start the positional information storage operation, and an LCD (Liquid Crystal Display) for displaying information.

The user presses down the start key to start the positional information storage operation.

The mobile phone 10, upon detecting that the start key was pressed down, transmits the information acquisition request to each of the first base station 20 and the second base station 30, and transmits an authentication start instruction to a fingerprint authentication apparatus 50.

When it receives information from the first base station 20, the second base station 30, or the fingerprint authentication apparatus 50, the mobile phone 10 transfers the received information to the memory card 60.

First Base Station 20

The first base station 20, upon receiving the information acquisition request from the mobile phone 10, generates first bearing information, and transmits the generated first bearing information to the management server 40.

The first bearing information indicates the bearing of the mobile phone 10 when viewed from the first base station 20, using numerals 0 to 360 that represent degrees of angle increasing clockwise, with 0 degrees corresponding to the north.

Japanese Laid-Open Patent Application No. 2002-27527 "Positional Information Notification Apparatus and Method" discloses a method of acquiring the partial positional information that is element information.

Second Base Station 30

The second base station 30, upon receiving the information acquisition request from the mobile phone 10, generates second bearing information, and transmits the generated second bearing information to the management server 40.

The second bearing information, as is the case with the first bearing information, indicates the bearing of the mobile phone 10 when viewed from the second base station 30, using numerals 0 to 360 that represent degrees of angle increasing clockwise, with 0 degrees corresponding to the north.

Management Server 40

The management server 40 is, for example, a computer system that includes a microprocessor, a ROM, a RAM, and an LCD unit. The RAM stores a computer program. The management server 40 achieves its functions when the microprocessor operates in accordance with the computer program.

The management server 40 has a management clock that measures time using an internal clock that runs by itself. The management server 40 also generates a digital signature.

The management server 40 generates in advance a pair of a communication public key and a communication secret key that are correlated with each other, and notifies the memory card 60 of the communication public key in advance.

The management server 40 receives reception bearing information, which is either the first bearing information or the second bearing information, from the first base station 20 or the second base station 30 (hereafter, the first base station 20 and the second base station 30 are generically called reception base stations).

The management server 40 reads from the management clock a time at which the reception bearing information was received and generates reception management time information. The management server 40 then generates reception signature information by placing, using the communication secret key, a digital signature on reception partial information that is composed of the reception bearing information and the reception management time information.

The management server 40 then transmits the reception bearing information, the reception management time information, and the reception signature information to the reception base station from which the reception bearing information was received.

The reception bearing information, reception management time information, reception partial information, and reception signature information transmitted to the first base station 20 are referred to as first bearing information, first management time information, first partial information, and first signature information, respectively.

The reception bearing information, reception management time information, reception partial information, and reception signature information transmitted to the second base station 30 are referred to as second bearing information, second management time information, second partial information, and second signature information, respectively.

How digital signatures are generated and verified is described in detail in "Modern Cryptography" by Tatsuaki Okamoto and Hirosuke Yamamoto, Sangyo Shuppan (publishing company), 1997.

Fingerprint Authentication Apparatus 50

The fingerprint authentication apparatus 50 is, for example, a computer system that includes a microprocessor, a ROM, a RAM, an LCD unit, and a fingerprint reading sensor. The RAM stores a computer program. The fingerprint authentication apparatus 50 achieves its functions when the microprocessor operates in accordance with the computer program.

FIG. 2 is a block diagram showing the construction of the fingerprint authentication apparatus 50.

The fingerprint authentication apparatus 50 includes a sensor unit 501, a fingerprint acquiring unit 502, an information accumulating unit 503, a judgment unit 504, and an information output unit 505.

The sensor unit 501 is an optical sensor for inputting fingerprints as image data.

The fingerprint authentication apparatus 50 starts to operate when the authentication start instruction is received from the mobile phone 10.

The user holds a finger over the sensor unit 501.

The sensor unit 501 obtains and inputs image data of a fingerprint of the finger by scanning it, and transmits the image data of the fingerprint to the fingerprint acquiring unit 502.

The fingerprint acquiring unit 502 processes the image data received from the sensor unit 501 and extracts from it characteristics of the fingerprint (for example, a characteristic of how a line divides), then generates the user's personal information using the types and positions of the extracted characteristics, and transmits the generated personal information to the judgment unit 504.

The information accumulating unit 503 stores in itself pieces of authentication information corresponding to fingerprints of authentication targets in advance, the pieces of authentication information being generated in the same manner as the personal information.

The judgment unit 504 reads the authentication information from the information accumulating unit 503, and judges whether the personal information matches the authentication information of the user. The judgment unit 504 instructs the information output unit 505 to transmit a write permission instruction to the mobile phone 10 if it judges affirmatively, and to transmit a write inhibition instruction if it judges negatively.

The information output unit 505 transmits either the write permission instruction or the write inhibition instruction to the mobile phone 10 as it is instructed by the judgment unit 504.

Memory Card 60

FIG. 3 is a block diagram showing the construction of the memory card 60.

The memory card 60 includes a tamper-resistant module 61 and a storage area 62 that is a non-volatile memory.

The memory card 60 is, for example, a computer system that includes a CPU, a ROM, a RAM or the like. The ROM stores a computer program. The memory card 60 achieves its functions when the CPU operates in accordance with the computer program.

The tamper-resistant module 61 has a mechanism for preventing a direct access from outside the tamper-resistant module 61 to the data stored in the ROM and the RAM.

The tamper-resistant module 61 includes a receiving unit 611, a digital signature verifying unit 612, a control unit 613, a clock unit 614, a position information generating unit 615, a digital signature generating unit 616, an output unit 617, and a time information judging unit 618.

The receiving unit 611, upon receiving the first partial information, second partial information, first signature information, or second signature information from the mobile phone 10, transmits the received information to the digital signature verifying unit 612. Also, if the receiving unit 611 receives the write inhibition instruction or write permission instruction, the receiving unit 611 transmits the received information to the control unit 613.

The digital signature verifying unit 612 holds in advance the communication public key generated by the management server 40.

The digital signature verifying unit 612 checks by using the first signature information and the communication public key whether the first partial information has been tampered with, and checks by using the second signature information and the communication public key whether the second partial information has been tampered with.

If it judges that neither the first partial information nor the second partial information has been tampered with, the digital signature verifying unit 612 transmits the first bearing information and the second bearing information to the position information generating unit 615, and the first management time information and the second management time information to the time information judging unit 618.

The position information generating unit 615 generates positional information composed of latitude information and longitude information for the mobile phone 10 from: latitude information and longitude information for the first base station 20 and the second base station 30 that are stored in advance; the received first bearing information; and the received second bearing information, and transmits the generated positional information for the mobile phone 10 to the digital signature generating unit 616.

The clock unit 614 contains an internal clock. When receiving a time acquisition request from the time information judging unit 618, the clock unit 614 generates internal time information indicating a time of the internal clock when the time acquisition request was received, and transmits the internal time information to the time information judging unit 618.

The time information judging unit 618, upon receiving the first management time information and the second management time information, transmits the time acquisition request to the clock unit 614, and receives the internal time information from the clock unit 614.

The time information judging unit 618 judges whether a time difference between the time indicated by the internal time information and the first management time information is no greater than a predetermined time period (in this example, five minutes). The time information judging unit 618 also judges whether a time difference between the time indicated by the internal time information and the second management time information is no greater than the predetermined time period (in this example, five minutes).

If the judgment result is in the affirmative, the time information judging unit 618 transmits the internal time information (which is equivalent to the generation time information) to the digital signature generating unit 616, and transmits the write permission instruction to the control unit 613.

If the judgment result is in the negative, the time information judging unit 618 transmits the write inhibition instruction to the control unit 613.

It should be noted here that the predetermined time period used by the time information judging unit 618 may be other than five minutes.

The digital signature generating unit 616 generates and stores beforehand a pair of a storage public key and a storage secret key that are correlated to each other and are used when information to be stored in the storage area 62 is verified or when a signature is placed on the information.

The storage public key is notified to the verification apparatus 70 in advance.

The digital signature generating unit 616 generates verification signature information by placing, using the storage secret key, a digital signature on trail information that is composed of the positional information and the internal time information, and transmits the trail information and the verification signature information to the control unit 613.

When receiving the trail information and the verification signature information from the digital signature generating unit 616, and the write permission instruction from each of the receiving unit 611 and the time information judging unit 618, the control unit 613 instructs the output unit 617 to write the trail information and the verification signature information into the storage area 62 (issues a write instruction).

When receiving the write inhibition instruction, the control unit 613 does not issue the write instruction to the output unit 617.

The output unit 617, upon receiving the write instruction from the control unit 613, writes the trail information and the verification signature information into the storage area 62.

Verification Apparatus 70

The verification apparatus 70 is, for example, a computer system that includes a microprocessor, a ROM, a RAM, an LCD unit, and a memory card slot. The RAM stores a computer program. The verification apparatus 70 achieves its functions when the microprocessor operates in accordance with the computer program.

The verification apparatus 70 holds the storage public key in advance.

The verification apparatus 70 reads the trail information and the verification signature information from the storage area 62 of the memory card 60 while the card is inserted in the memory card slot.

The verification apparatus 70 verifies using the storage public key whether the read verification signature information is authentic.

The manager can recognize that the trail information has been tampered and there has been an unauthorized manipulation of information if the verification apparatus 70 fails to verify the authenticity of the verification signature information.

Operation

FIG. 4 is a flowchart of the operation in the positional information storage system 1 after the user instructs to start the storage information until the trail information and the verification signature information are stored in the memory card 60.

The user presses down the start key of the mobile phone 10 to start the positional information storage operation (step S101).

The mobile phone 10, upon detecting that the start key was pressed down, transmits the information acquisition request to each of the first base station 20 and the second base station 30, and transmits an authentication start instruction to a fingerprint authentication apparatus 50 (step S102).

The first base station 20 generates the first bearing information and transmits the generated first bearing information to the management server 40 (step S103).

The second base station 30 generates the second bearing information and transmits the generated second bearing information to the management server 40 (step S103).

When it receives the first bearing information, the management server 40 generates the first management time information and then the first signature information, and transmits the generated information to the first base station 20.

When it receives the second bearing information, the management server 40 generates the second management time information and then the second signature information, and transmits the generated information to the second base station 30 (step S104).

The first base station 20 transmits the first partial information and the first signature information to the memory card 60 via the mobile phone 10.

The second base station 30 transmits the second partial information and the second signature information to the memory card 60 via the mobile phone 10.

The receiving unit 611 receives the first partial information and the first signature information and receives the second partial information and the second signature information (step S105).

The receiving unit 611 transmits the first partial information, the first signature information, the second partial information, and the second signature information to the digital signature verifying unit 612.

The digital signature verifying unit 612 verifies whether the first signature information and the second signature information are authentic by checking whether the first partial information or the second partial information has been tampered with (step S106).

If the verification result in the step S106 is in the negative, the positional information storage process ends.

If the verification result in the step S106 is in the affirmative, the positional information storage process continues.

The digital signature verifying unit 612 transmits the first bearing information and the second bearing information to the position information generating unit 615, and transmits the first management time information and the second management time information to the time information judging unit 618.

The time information judging unit 618 judges whether a time difference between the time indicated by the internal time information and the first management time information is no greater than a predetermined time period (in this example, five minutes), and whether a time difference between the time indicated by the internal time information and the second management time information is no greater than the predetermined time period (step S107).

If the judgment result in step S107 is in the negative, the time information judging unit 618 transmits the write inhibition instruction to the control unit 613, and the positional information storage process ends.

If the judgment result in step S107 is in the affirmative, the time information judging unit 618 transmits the internal time information to the digital signature generating unit 616, and transmits the write permission instruction to the control unit 613.

The position information generating unit 615 generates the positional information (step S108).

The digital signature generating unit 616 generates the trail information and the verification signature information (step S109).

The fingerprint authentication apparatus 50 judges whether the user is identical with the claimed authentication target by comparing their fingerprints (step S110).

If the judgment result in step S110 is in the negative, the fingerprint authentication apparatus 50 transmits the write inhibition instruction to the mobile phone 10, and if the judgment result is in the affirmative, the fingerprint authentication apparatus 50 transmits the write permission instruction to the mobile phone 10.

The control unit 613 of the memory card 60 judges whether the trail information and the verification signature information are permitted to be written into the storage area 62 (step S11).

If the judgment result in step S111 is in the affirmative, the control unit 613 writes the trail information and the verification signature information into the storage area 62 via the output unit 617 (step S112).

If the judgment result in step S111 is in the negative, the control unit 613 does not write the information into the storage area 62.

Now, how the information written to storage area 62 is verified will be described.

The verification apparatus 70 reads the trail information and the verification signature information from the storage area 62 of the memory card 60.

The verification apparatus 70 verifies using the storage public key, which has been held inside beforehand, whether the read verification signature information is authentic.

The manager can recognize that the trail information has not been tampered with if the verification result by the verification apparatus 70 is in the affirmative, and can recognize that the trail information has been tampered with if the verification result is in the negative.

Modifications

The present invention is not limited to the above-described embodiment, but may be modified, for example, as follows:

(1) The present invention may be a method that contains the steps described in the embodiment. Also, the present invention may be a computer program that enables the method to be achieved by a computer. Also, the present invention may be digital signals that represent the computer program.

Also, the present invention may be a computer-readable recording medium such as a flexible disk, hard disk, CD-ROM, MO, DVD, DVD-ROM, DVD-RAM, BD (Blue-Ray Disc), and semiconductor memory in which the computer program or the digital signals are recorded. Also, the present invention may be the computer program or the digital signals that are recorded in such a recording medium.

Also, the present invention as the computer program or the digital signals may be transmitted via an electric communication line, a wireless or wired communication line, or a network such as the Internet.

Also, the present invention may be a computer system that includes a microprocessor and a memory, where the memory stores a computer program, and the microprocessor operates in accordance with the computer program.

Also, the present invention as the computer program or the digital signals may be transferred via the recording medium or the network or the like from a computer system to another independent computer system to be executed therein.

(2) In the above-described embodiment, the mobile phone acquires the bearing information from each of a plurality of reception base stations, and generates the positional information from the plurality of acquired pieces of bearing information. However, if a reception base station can generate the positional information, the mobile phone may acquire the positional information from the reception base station.

(3) In the above-described embodiment, two reception base stations transmit the bearing information. However, not limited to this, three or more base stations transmit the bearing information.

Also, in the above-described embodiment, the positional information is generated from the bearing information that indicates the bearing of the mobile phone when viewed from the reception base station. However, the mobile phone may generated the positional information from distance information that indicates a distance between the reception base station and the mobile phone.

(4) In the above-described embodiment, the mobile phone acquires the bearing information. However, instead of this, the mobile phone may use the Global Positioning System (GPS) and generate the positional information from information transmitted from a satellite.

(5) The tamper-resistant module may not have the clock unit, but may generate trail information from the generated positional information and time information acquired from the management server.

(6) In the above-described embodiment, the fingerprint authentication apparatus 50 judges for authentication whether the personal information matches the authentication information. However, the fingerprint authentication apparatus 50 may judge whether the personal information matches the authentication information in terms of a certain range thereof.

(7) In the above-described embodiment, the characteristic extraction method is used to authenticate the fingerprint. However, not limited to this, the following methods, for example, may be used: the pattern matching method in which a fingerprint image is superposed on another for comparison; and the frequency analysis method in which image data is converted into waveform data, and the frequency component of the waveform data is analyzed.

(8) The signature generating unit may generate the storage public key and the storage secret key from information unique to the user, such as the user's fingerprint.

(9) A mobile phone is used in the above-described embodiment. However, a mobile wireless terminal such as a Personal Digital Assistant (PDA) or a mobile personal computer may be used instead.

(10) The above-described embodiment may be combined with any of the above-described modifications.

Although the present invention has been fully described by way of examples with reference to the accompanying drawings, it is to be noted that various changes and modifications will be apparent to those skilled in the art. Therefore, unless such changes and modifications depart from the scope of the present invention, they should be construed as being included therein.

What is claimed is:

1. A positional information storage system comprising:
   a transmission apparatus;
   a communication terminal apparatus;
   a mobile semiconductor memory including an information storage unit, which has an area for storing information and a tamper-resistant module; and
   a verification apparatus, wherein
   the transmission apparatus is operable to transmit element information concerning a position of the communication terminal apparatus, to the communication terminal apparatus,
   the communication terminal apparatus is operable to receive the element information from the transmission apparatus and output the element information to the mobile semiconductor memory,
   the tamper-resistant module of the mobile semiconductor memory includes:
      a position management unit operable to generate positional information based on the element information;
      a time acquiring unit operable to acquire generation time information that indicates a time related to the positional information;
      a signature generating unit operable to generate signature data by placing a digital signature on trail information that is composed of the generation time information and the positional information; and
      a writing unit operable to write the trail information and the signature data as corresponding to each other into the information storage unit, and
   the verification apparatus reads the trail information and the signature data from the information storage unit of the mobile semiconductor memory and verifies the trail information using the trail information and the signature data.

2. The positional information storage system of claim 1, wherein the time acquiring unit generates the generation time information that indicates a time at which the positional information is generated.

3. The positional information storage system of claim 2, wherein the tamper-resistant module further includes a control unit operable to, when a predetermined condition is met, control the writing unit so as to inhibit writing of the trail information and the signature data.

4. The positional information storage system of claim 3, further comprising a management server including a clock, the management server being operable to transmit server time information generated based on the clock, wherein the tamper-resistant module further includes a time information judging unit operable to receive the server time information and if a difference between values indicated by the server time information and the generation time information is greater than a predetermined value, transmit a write inhibition instruction to the control unit, and
upon receiving the write inhibition instruction, the control unit judges that the predetermined condition is met, and controls the writing unit so as to inhibit writing of the trail information and the signature data.

5. The positional information storage system of claim 3, further comprising an authentication apparatus operable to store in advance pieces of authentication information to be used for authentication, acquire personal information from a user, and transmit a write inhibition instruction to the control unit if the personal information does not match one of the pieces of authentication information, wherein
upon receiving the write inhibition instruction, the control unit judges that the predetermined condition is met, and controls the writing unit so as to inhibit writing of the trail information and the signature data.

6. The positional information storage system of claim 5, wherein the authentication apparatus stores, as the pieces of authentication information, characteristics of fingerprints, and acquires characteristics of a fingerprint of the user from the user as the personal information.

7. The positional information storage system of claim 1, further comprising a management server having a clock the management server being operable to transmit server time information generated based on the clock, wherein
the time acquiring unit acquires the server time information as the generation time information.

8. The positional information storage system of claim 7, wherein the tamper-resistant module further includes a control unit operable to, when a predetermined condition is met, control the writing unit so as to inhibit writing of the trail information and the signature data.

9. The positional information storage system of claim 8, further comprising an authentication apparatus operable to store in advance pieces of authentication information to be used for authentication, acquire personal information from a user, and transmit a write inhibition instruction to the control unit if the personal information does not match one of the stored pieces of authentication information, wherein
upon receiving the write inhibition instruction, the control unit judges that the predetermined condition is met, and controls the writing unit so as to inhibit writing of the trail information and the signature data.

10. The positional information storage system of claim 9, wherein the authentication apparatus stores, as the pieces of authentication information, characteristics of fingerprints, and acquires characteristics of a fingerprint of the user from the user as the personal information.

11. A positional information storage system comprising:
   a transmission apparatus;
   the communication terminal apparatus;
   a mobile semiconductor memory including an information storage unit, which has an area for storing information, and a tamper-resistant module; and
   a verification apparatus, wherein
   the transmission apparatus is operable to transmit (i) element information concerning a position of the communication terminal apparatus and (ii) additional data which is generated by placing a digital signature on the element information, to the communication terminal apparatus, the communication terminal apparatus is operable to receive the element information and the additional data and output the element information and the additional data to the mobile semiconductor memory, the tamper-resistant module of the mobile semiconductor memory includes:

a position management unit operable to, if verified by checking the additional data that the element information has not been tampered with, generate positional information based on the element information;

a time acquiring unit operable to acquire generation time information that indicates a time related to the positional information;

a signature generating unit operable to generate signature data by placing a digital signature on trail information that is composed of the generation time information and the positional information; and a writing unit operable to write the trail information and the signature data as corresponding to each other into the information storage unit, and the verification apparatus reads the trail information and the signature data from the information storage unit of the mobile semiconductor memory and verifies the trail information using the trail information and the signature data.

12. A mobile, tamper-resistant semiconductor memory for a communication terminal apparatus, the semiconductor memory comprising:

an information storage unit which has an area for storing information; and a tamper resistant module including:

a position management unit operable to receive element information from the communication terminal apparatus, the element information being related to a position of the communication terminal apparatus, and generate, based on the element information, positional information that indicates a position of the communication terminal apparatus;

a time management unit operable to generate generation time information that indicates a time at which the positional information is generated;

a signature generating unit operable to generate signature data by placing a digital signature on trail information that is composed of the generation time information and the positional information; and a writing unit operable to write the trail information and the signature data as corresponding to each other into the information storage unit.

13. The semiconductor memory of claim 12, wherein the signature generating unit places the digital signature on the trail information using personal information, which has been held in advance, as a secret key.

14. The positional information storage system of claim 1, wherein the mobile semiconductor memory is removably insertable into the communication terminal apparatus.

15. The positional information storage system of claim 11, wherein the mobile semiconductor memory is removably insertable into the communication terminal apparatus.

16. The semiconductor memory of claim 12, wherein the semiconductor memory is removably insertable into the communication terminal apparatus.

* * * * *